(12) United States Patent
Adsuar Christiansen

(10) Patent No.: US 11,559,168 B2
(45) Date of Patent: Jan. 24, 2023

(54) BREAD TOASTER ACCESSORY FOR MELTING COLD SOLID SPREADS

(71) Applicant: Conchita Adsuar Christiansen, San Juan, PR (US)

(72) Inventor: Conchita Adsuar Christiansen, San Juan, PR (US)

( * ) Notice: Subject to any disclaimer, the term of this patent is extended or adjusted under 35 U.S.C. 154(b) by 128 days.

(21) Appl. No.: 17/134,897

(22) Filed: Dec. 28, 2020

(65) Prior Publication Data

US 2022/0202242 A1 Jun. 30, 2022

(51) Int. Cl.
*A47J 37/08* (2006.01)

(52) U.S. Cl.
CPC .................. *A47J 37/0871* (2013.01)

(58) Field of Classification Search
CPC ....... A47J 37/06; A47J 37/0871; A47J 99/339
USPC ............................................................ 99/339
See application file for complete search history.

(56) References Cited

U.S. PATENT DOCUMENTS

| | | | | |
|---|---|---|---|---|
| 2,089,315 A | * | 8/1937 | Wheeler | A47J 37/08 99/402 |
| 2,345,769 A | | 10/1940 | Osrow | |
| 2,521,855 A | * | 9/1950 | Kodadek | A47J 37/0878 219/521 |
| 2,595,010 A | * | 4/1952 | Simpson | A47G 19/26 220/366.1 |
| 2,639,658 A | | 5/1953 | Biehls | |
| 2,693,751 A | * | 11/1954 | Allen | A47J 37/0878 126/30 |
| 2,763,198 A | * | 9/1956 | Williams | A47J 37/0885 99/419 |
| 2,769,387 A | * | 11/1956 | Penick | A47J 37/0611 219/475 |
| 2,847,930 A | * | 8/1958 | Evans | A47J 37/0871 118/58 |
| 2,880,665 A | * | 4/1959 | Katz | A47J 37/0878 126/9 B |
| 3,866,525 A | * | 2/1975 | Oxel | A47J 37/0878 99/357 |
| 4,276,821 A | | 7/1981 | Brown | |
| 4,290,349 A | * | 9/1981 | Fiorenza | A47J 37/0885 16/361 |
| 4,656,927 A | * | 4/1987 | Mosby | A47J 37/0892 99/402 |
| 5,203,252 A | | 4/1993 | Hsieh | |
| 5,853,781 A | * | 12/1998 | Bono | A47J 37/0885 99/402 |
| 5,988,046 A | * | 11/1999 | Noll | A47J 43/18 99/410 |

(Continued)

FOREIGN PATENT DOCUMENTS

EP 1030585 B1 8/2000

OTHER PUBLICATIONS

Pairpoint (http://ancientpoint.com/inf/91011-pairpoint_silver_plate_empire_style_rectangular_gravy_boat_and_tray_made_in_usa.html (Year: 1940).*

*Primary Examiner* — Ibrahime A Abraham
*Assistant Examiner* — Frederick F Calvetti
(74) *Attorney, Agent, or Firm* — Eugenio J. Torres-Oyola; Victor M. Rodriguez-Reyes; Rafael Rodriguez-Muriel

(57) ABSTRACT

An accessory for efficiently melting or softening cold solid spreads using the heat emanating from a bread toaster that in turn is easy to use or clean; reduces the risk of spillage; and can be used on any conventional toaster.

11 Claims, 11 Drawing Sheets

(56) References Cited

U.S. PATENT DOCUMENTS

| | | | |
|---|---|---|---|
| 6,973,871 B1 * | 12/2005 | Chuang | A47J 37/0878 |
| | | | 99/357 |
| 7,047,871 B1 * | 5/2006 | Christoffel | A47J 37/0871 |
| | | | 99/385 |
| 7,250,588 B2 | 7/2007 | Ely | |
| 7,290,482 B2 * | 11/2007 | Pan | A47J 37/0892 |
| | | | 219/521 |
| 7,467,583 B2 * | 12/2008 | Lam | A47J 37/0871 |
| | | | 219/521 |
| 8,240,246 B2 * | 8/2012 | Davis | A47J 37/0885 |
| | | | 99/402 |
| 9,675,210 B2 * | 6/2017 | Abukashef | A47J 37/0835 |
| 9,706,876 B2 * | 7/2017 | Walker | A47J 37/0885 |
| 11,266,266 B2 * | 3/2022 | Lehman | A47J 37/0688 |
| 2008/0173185 A1 | 7/2008 | Lam | |
| 2017/0303742 A1 * | 10/2017 | Gallego, II | A47J 37/0885 |

\* cited by examiner

BREAD TOASTER ACCESSORY FOR MELTING COLD SOLID SPREADS

FIELD OF THE DISCLOSURE

This disclosure relates to accessories for bread toasters. More particularly, the present disclosure relates to a tray configured to fit within one or two of the slots in a toaster in order to melt or soften cold solid spreads or substances within the tray using the heat emanating from the toaster's heating element.

BACKGROUND OF THE DISCLOSURE

One problem in common for those who work, or are involved, in the field of food preparation is the application of cold solid spreads to bread; especially after the bread has been toasted. It is often difficult or cumbersome to achieve an even distribution of these solid spreads across the soft part of the bread (i.e., the crumb). A few solutions have been proposed to address this problem, but all appear to have drawbacks that make these solutions less than ideal, as more particularly describe below. For example, U.S. Pat. No. 2,639,658 A to Biehls, discloses a bread toaster comprising a removable glass receptacle having downwardly converging bottom wall portions, wherein the receptacle is disposed within a well in the body of the toaster that is in proximity to the resistance elements of the toaster in order to melt butter within the receptacle. The receptacle in Biehls, however, can only be used in a toaster having the well described therein; otherwise, the receptacle would not fit in the body of the toaster. In other words, the receptacle in Biehls would not fit in a conventional toaster unless the toaster had additional space in its body. Accordingly, Biehls does not constitute a cost-effective solution because it can only be used in toasters having the specifications described therein. Furthermore, given that the receptacle has downwardly converging bottom wall portions, any butter residue stuck in that area would be difficult to clean because it would be hard to reach with a wipe or person's finger. As such, Biehls constitutes a less than ideal solution for those concerned with hygiene or for restaurants who need to comply with sanitation standards.

Another example is U.S. Pat. No. 4,276,821 A to Brown, which relates to a device comprising an upright support member that can be detachably secured to the top of the toaster (either magnetically or via a clamping relationship with the toaster) and a ladle which can be removably supported on the support member while the toaster is energized, such that the heat rising from the toaster during the toasting process is directed to the ladle in order to melt the butter contained in the ladle. In this solution, however, the cold solid spread will take longer to melt (or not melt all the way through) because the ladle is a placed a few inches above the bread slots; and as such, is not in close proximity to the toaster's heating element. Thus, the toaster's heat source would have to compete with the environment, which is usually colder than the heat emanating from the toaster. As such, Brown is not an efficient manner to melt cold solid spreads. Moreover, given that the ladle is located inches above the bread slots, it has a high probability of tipping over whenever a user is interacting with the toaster. As such, Brown constitutes a less than ideal solution for those interested in melting cold solids in an efficient manner or in reducing risk of causing spillage when using or interacting with the toaster.

Another example is US Pub. No. 2008/0173185 A1 to Lam, which relates to a unified toaster and cooker wherein the cooker has plural food-heating locations (including a removable pan) arranged around one electrical heating element. The removable pan in Lam, however, can only be used in a toaster having the elements described therein. As such, the pan in Lam would not fit or be compatible with a conventional or traditional toaster. Accordingly, Lam does not constitute a cost-effective solution to drawbacks in the art since it can only be used in toasters having the specific elements recited therein.

Accordingly, it would be desirable to have an accessory for efficiently melting or softening cold solid spreads using the heat emanating from a bread toaster that in turn is easy to use or clean; reduces the risk of spillage; and can be used on any conventional toaster.

SUMMARY OF THE DISCLOSURE

The disclosure relates to an accessory for melting or softening cold or solid spreads using the heat emanating from a bread toaster having at least one slot for receiving a food item into the toaster, a least one toaster heating element for toasting or heating the food item, at least one electrical circuit for supplying electrical power to the toaster heating element, the accessory comprising at least one tray configured to fit into one of the slots of a bread toaster in order to be in close proximity with the heating element of the bread toaster; wherein the tray comprises two side walls sitting opposite to each other, two end walls also sitting opposite to each other and a base; wherein each side wall includes a corresponding bottom end and a corresponding top end; wherein each end wall includes a corresponding bottom end and a corresponding top end; wherein both side walls and end walls are obliquely joined, via the corresponding bottom ends, to the base, thereby defining the bottom of the tray; wherein the side walls and end walls project upwardly and away from the center of the base; wherein each side wall includes end portions that converge with corresponding end portions on the end walls, thereby defining, in combination with the base, an interior of the tray; wherein the interior of the tray comprises rounded edges at the point or area of the tray in which the side walls and end walls converge with each other and at the point or area of the tray in which the side walls and end walls obliquely join or converge with the base; wherein the tray comprises a rim surrounding the top end of the side walls and the top end of the end walls; and wherein the rim includes a spout integrated therein and corresponding with one of the rounded edges at the point or area of the tray in which the side walls and end walls converge with each other.

DETAILED DESCRIPTION OF THE DISCLOSURE

Figure 1:
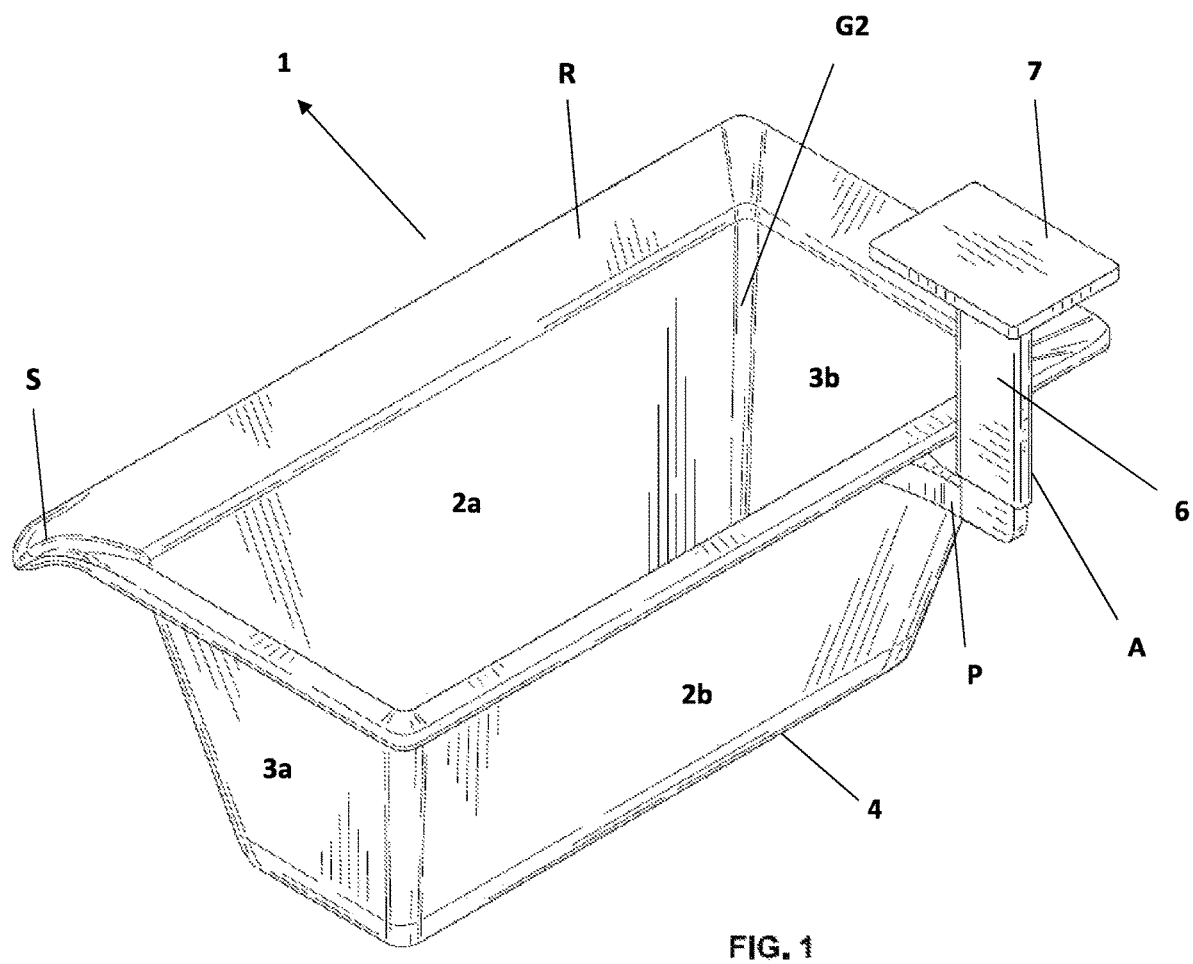
FIG. 1 is a perspective view of a tray for use in one of a bread toaster's slots.
Figure 2:
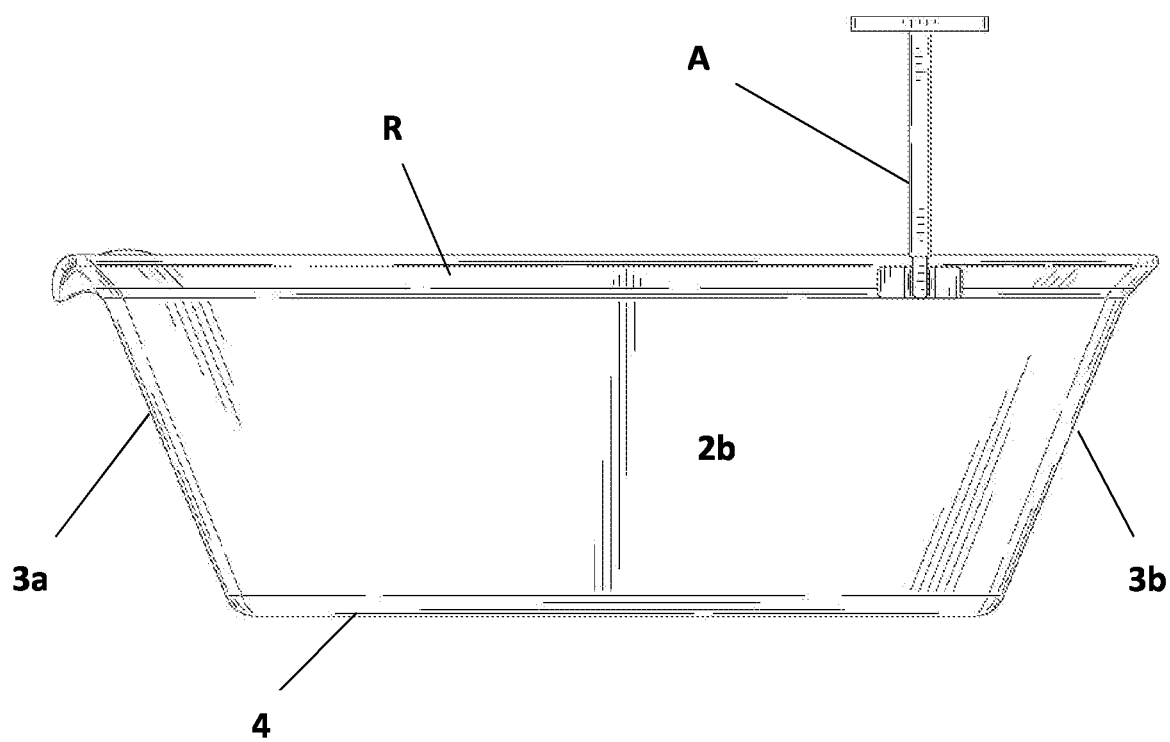
FIG. 2 is a right-side view of the tray.
Figure 3:
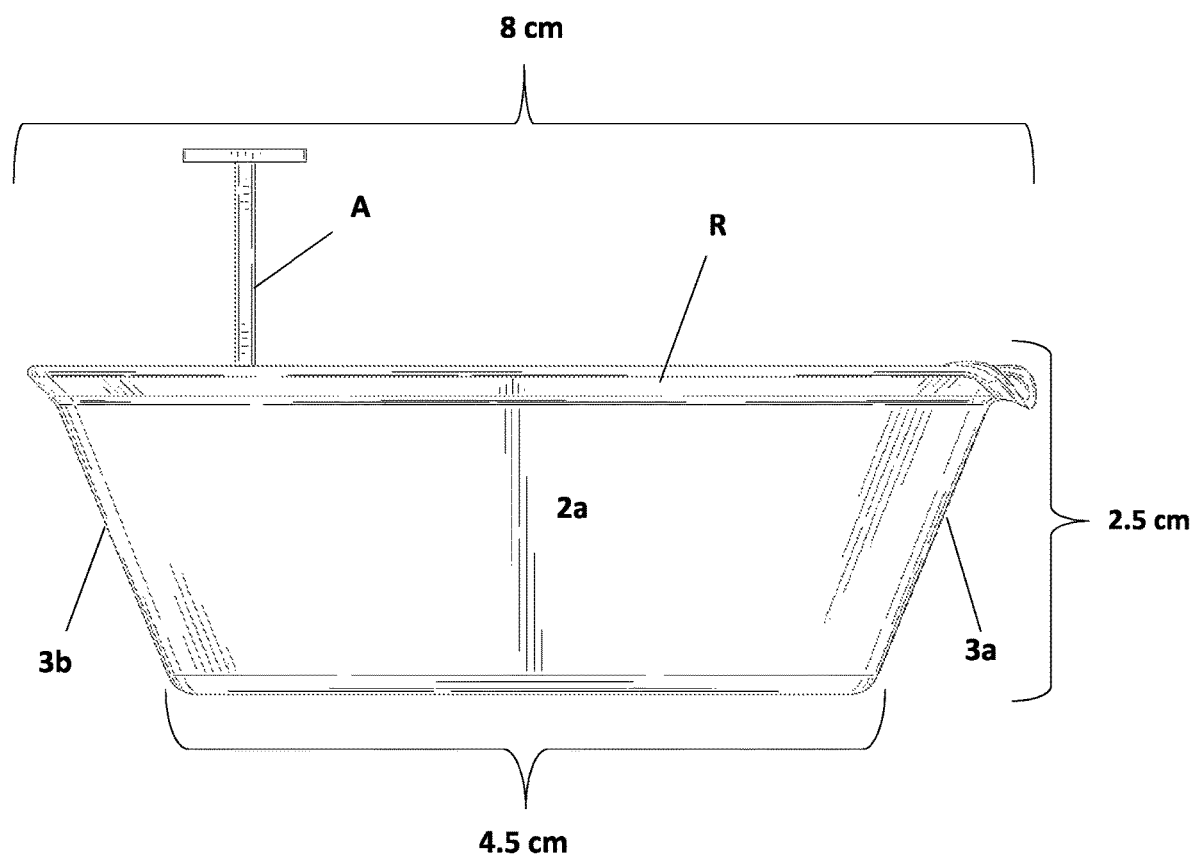
FIG. 3 is a left-side view of the tray.
Figure 4:
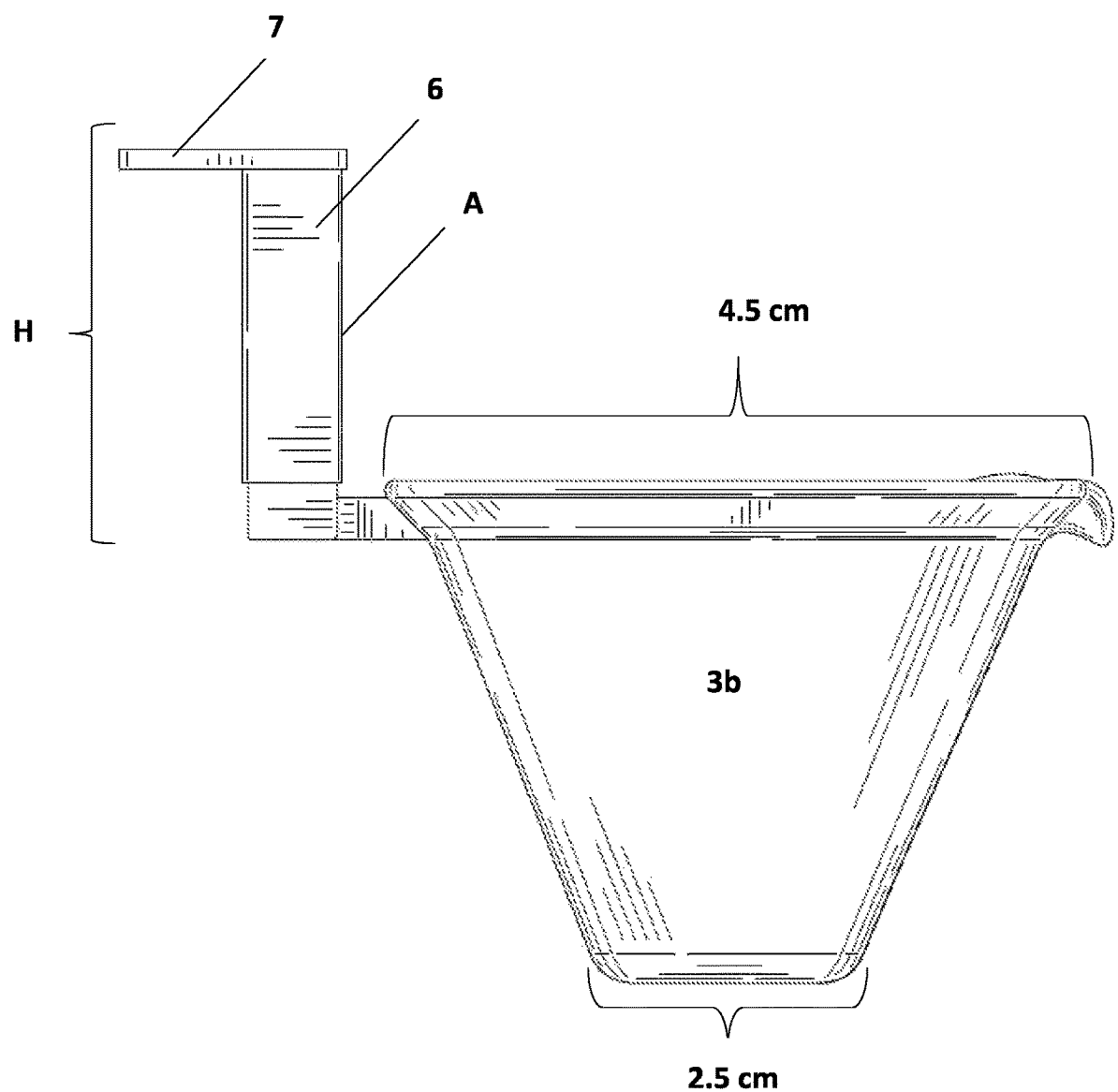
FIG. 4 is a rear view of the tray.
Figure 5:
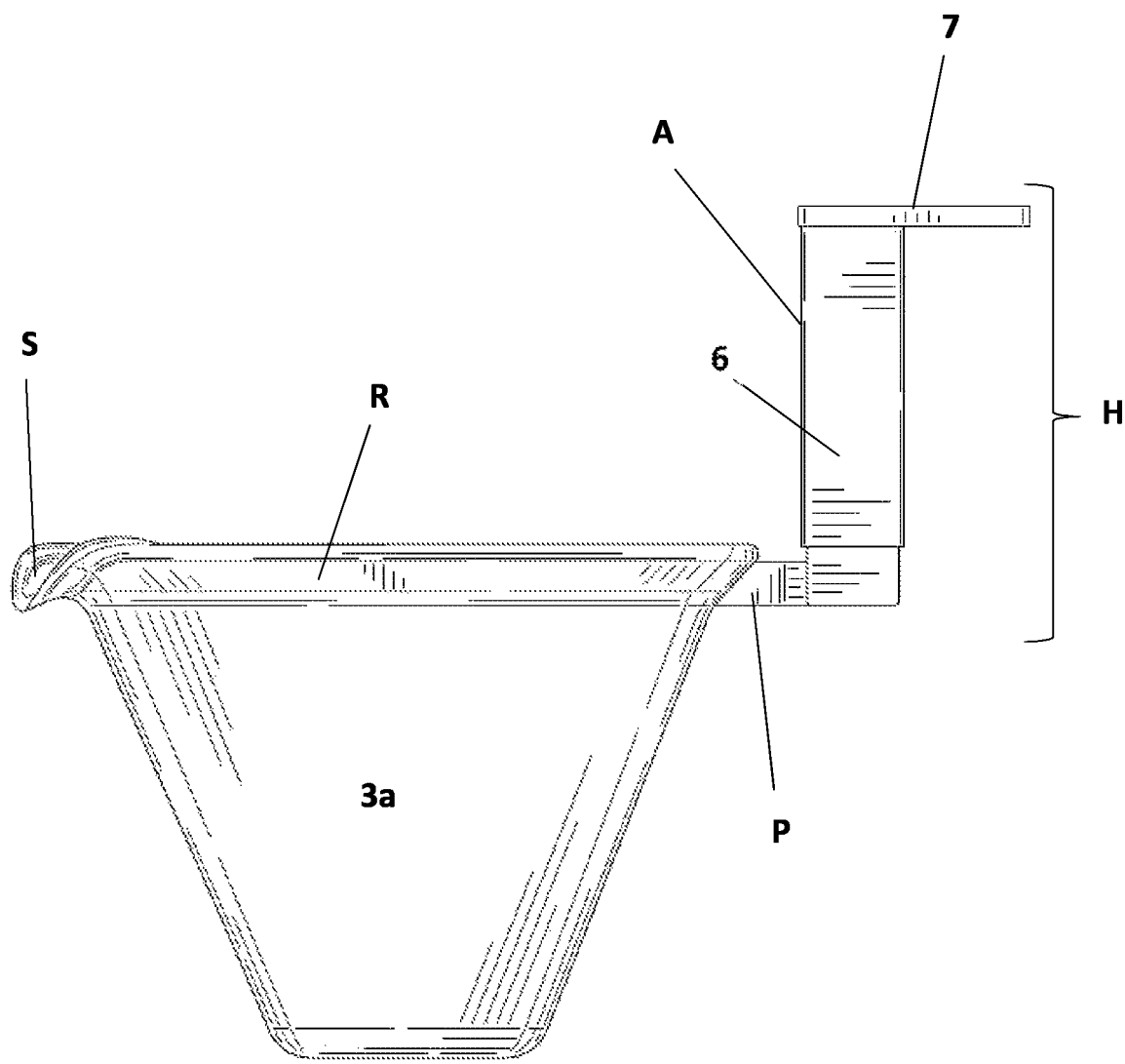
FIG. 5 is a front view of the tray.
Figure 6:
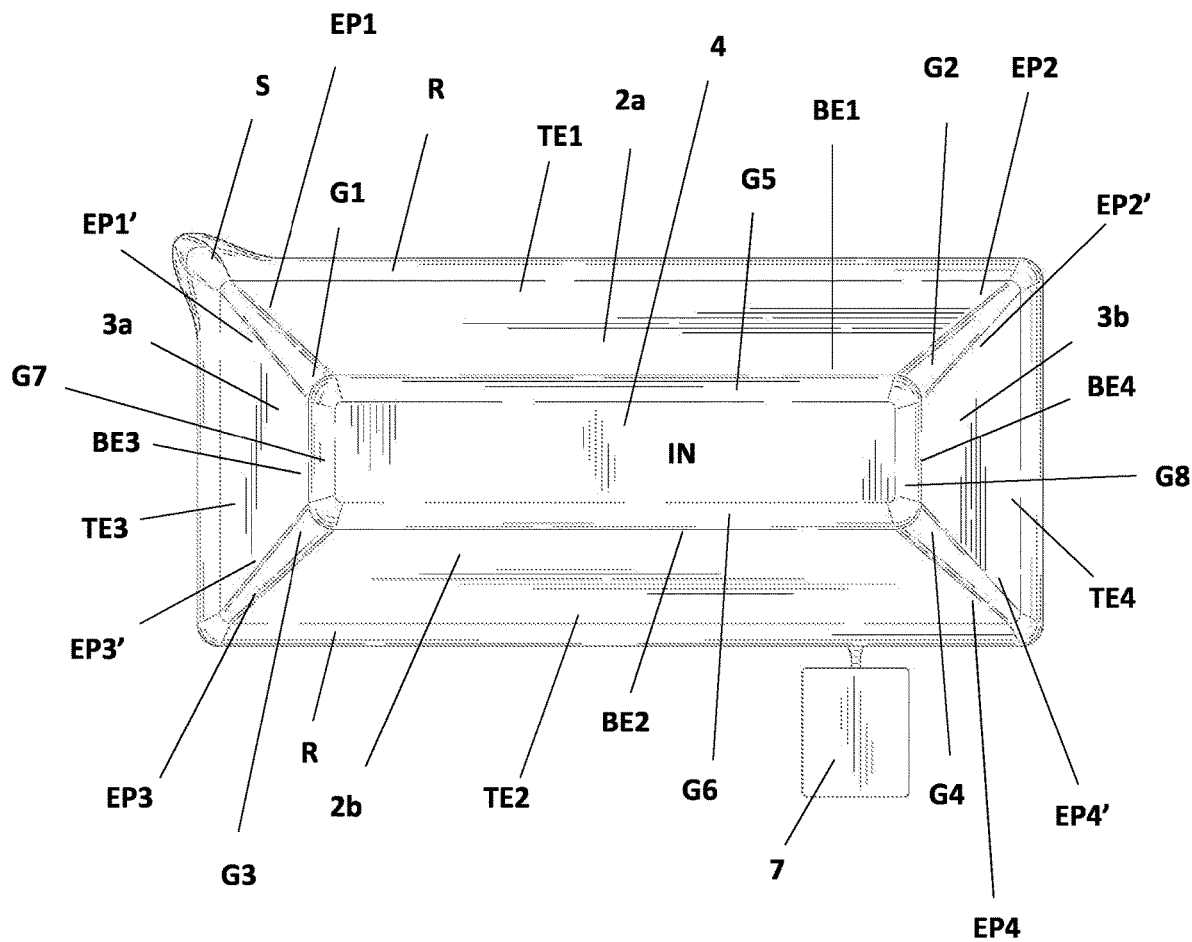
FIG. 6 is a top view of the tray.
Figure 7:
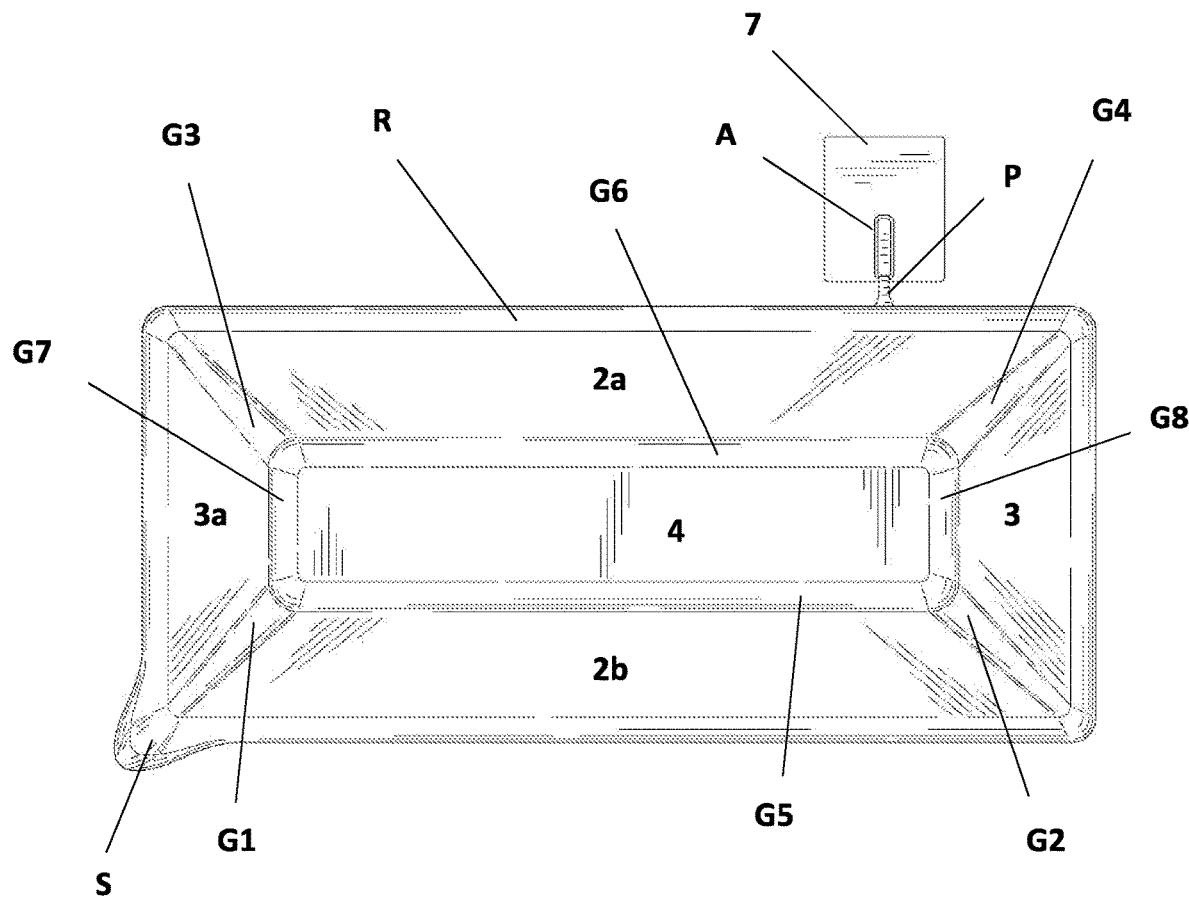
FIG. 7 is a bottom view of the tray.
Figure 8:
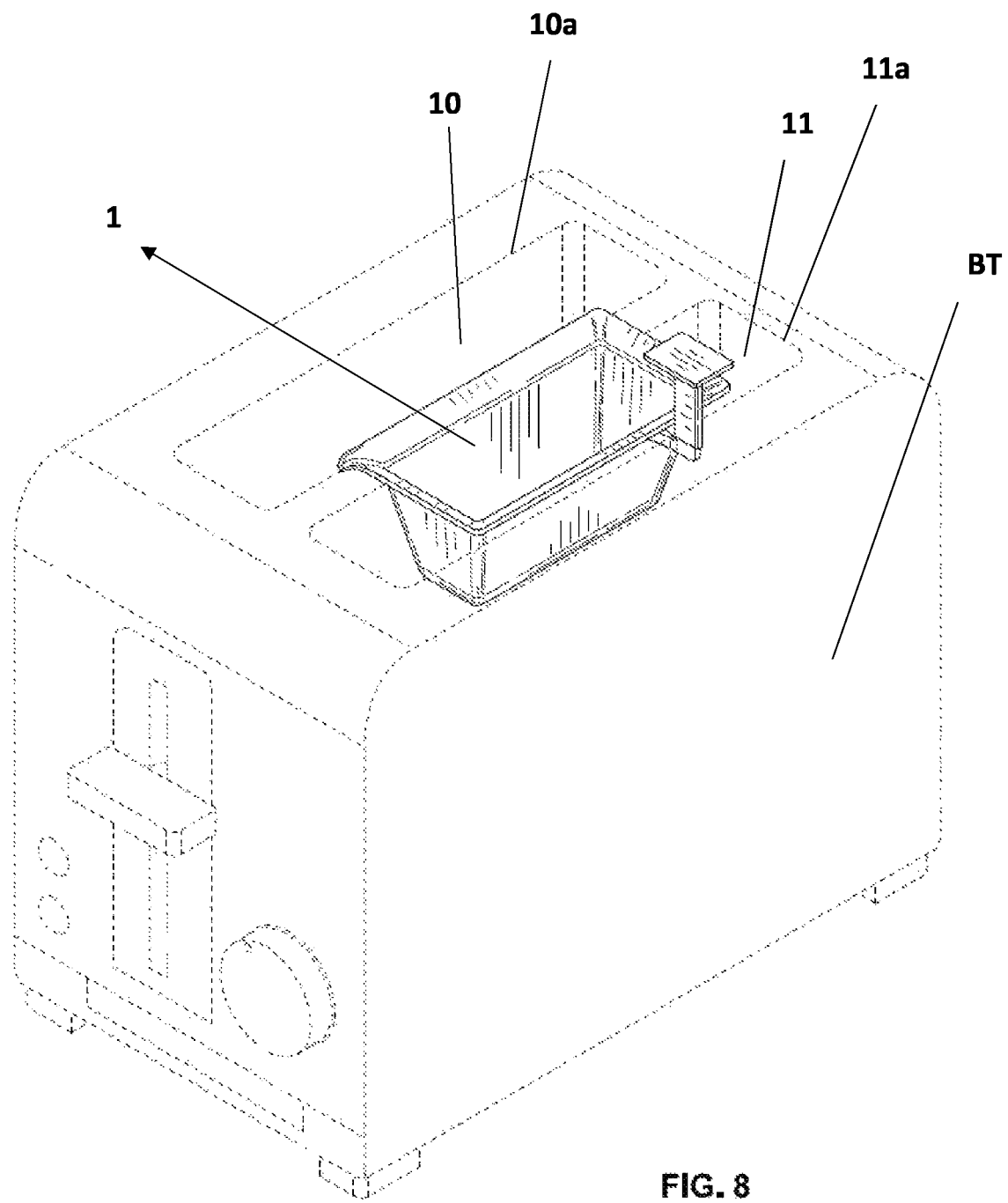
FIG. 8 is a perspective view of a tray placed on one of the bread toaster's slots.

The disclosure relates to an accessory for efficiently melting or softening cold solid spreads (e.g., frozen butter) using the heat emanating from a bread toaster. As shown in FIG. 8, the accessory comprises a tray 1 configured to fit into one of the slots 10, 11 of a bread toaster BT. Particularly, the tray 1 includes two side walls 2a, 2b sitting opposite to each other; two end walls 3a, 3b also sitting opposite to each other; and a base 4 with rounded corners (preferably), as shown in FIGS. 1-7. Each side wall 2a, 2b of the tray 1 includes a corresponding bottom end BE1, BE2 and a corresponding top end TE1, TE2. Similarly, each end wall 3a, 3b includes a corresponding bottom end BE3, BE4 and a corresponding top end TE3, TE4. Moreover, both side walls 2a, 2b and end walls 3a, 3b are obliquely joined, via the corresponding bottom ends BE1, BE2, BE3, BE4, to the base 4, thereby forming or defining the bottom of the tray 1. Additionally, each side wall 2a, 2b includes end portions EP1, EP2, EP3, EP4 that converge with corresponding end portions EP1', EP2', EP3', EP4' on the end walls 3a, 3b, thereby forming or defining, in combination with the base 4, an interior IN of the tray 1.

It should be noted that the point or area in which the side walls 2a, 2b and end walls 3a, 3b converge with each other (i.e., the end portions EP1, EP2, EP3, EP4 and EP1', EP2', EP3', EP4') has rounded edges G1, G2, G3, G4. Similarly, the point or area in which the side walls 2a, 2b and end walls 3a, 3b obliquely join or converge with the base 4 (i.e., the bottom ends BE1, BE2, BE3 and BE) also has rounded edges G5, G6, G7, G8. Therefore, the interior IN of the tray 1 has a perimeter with a rounded edge configuration. Such rounded edge configuration prevents residue being accumulated within the edges of the tray and thus, facilitates cleaning of the tray 1.

Moreover, as shown in FIGS. 1-8, the tray 1 comprises a rim R surrounding the top end TE1, TE2 of the side walls 2a, 2b and the top end TE3, TE4 of the end walls 3a, 3b, wherein the rim R includes a spout S integrated therein having a location that corresponds with one of the rounded edges G1, G2, G3, G4 on the area where the side walls 2a, 2b and end walls 3a, 3b converge with each other. Furthermore, as shown in FIGS. 1, 4-7, the rim R projects away from the interior of the tray 1 (i.e., away from the center of the tray). Such configuration, along with the spout S, facilitates the pouring of a substance within the interior of the tray 1 (such as, cold solid spreads or butter) once it has been melted. It is important to note that the tray 1 is preferably manufactured from a material having a high thermal conductivity rating such as, metal, so that it can efficiently transfer the heat emanating from the bread toaster's BT heating element HE. Using metal has the added benefit that it allows the tray 1 to heat up fast, thereby allowing the cold solid substance in the tray to melt; but also cools down fast enough so as to allow a person to grab it without getting burned.

As evident from the above description, the configuration of the tray 1 is one in which the side walls 2a, 2b and end walls 3a, 3b project upwardly and away from the center of the base 4. In other words, the tray 1 increases in width and length as one moves from the bottom of the tray 1 to the top of the tray 1. Moreover, the length of the side walls 2a, 2b is greater than the length of the end walls 3a, 3b. This configuration provides certain benefits. Namely, i) it allows a portion of the tray 1 (i.e., the bottom portion of tray) to fit inside of the bread slot 10, 11 of a bread toaster BT, thereby permitting the tray 1 to be in close proximity to the heating element HE of the bread toaster BT; ii) it allows the remaining portion of the tray 1 (i.e., the upper portion of tray) to rest stably on the edges 10a, 11a of the bread slot 10, 11, thereby preventing the tray 1 from falling to the bottom of the bread slot 10, 11; and iii) it allows the tray 1 to fit in all conventional bread toasters. To achieve the foregoing, the preferred embodiment of the tray 1 should have the following measurements: The width from the top end TE1 of the first side wall 2a to the top end TE2 of the second side wall 2b, is 4.5 cm wide; and the width from the bottom end BE1 of the first side wall 2a to the bottom end BE2 of the second side wall 2b, is 2.5 cm wide. The length from the top end TE3 of the first end wall 3a to the top end TE4 of the second end wall 3b, is 8 cm long; and the length from the bottom end BE3 of the first end wall 3a to the bottom end BE4 of the second end wall 3b, is 7 cm long. Lastly, the height from the bottom ends BE1, BE2 of the side walls 2a, 2b to the corresponding top ends TE1, TE2 of the side walls 2a, 2b, is 2.5 cm high. Similarly, the height from the bottom ends BE3, BE4 of the end walls 3a, 3b to the corresponding top ends TE3, TE4 of the end walls 3a, 3b, is 2.5 cm high. These measurements ensure that above-mentioned benefits of the tray 1 can be achieved.

In accordance with a preferred embodiment, the tray 1 comprises a handle H integrated with the rim R, as shown in FIGS. 1-8. It should be noted, however, that in other embodiments of the tray, the handle H may be integrated into one of the side walls 2a, 2b or end walls 2a, 2b. The handle H facilitates grabbing of the tray and allows users to place the tray into one of the bread slots 10, 11 of a toaster without having to touch other portions of the tray 1; thereby, reducing the risk of spillage of the contents of the tray or preventing users from getting burned when grabbing a tray 1 that has been subjected to the heat emanating from a toaster. The handle H preferably has an L-shape configuration. That is, the handle H comprises a protrusion P that is integrated to the rim R of the tray 1, and an arm A that is perpendicularly joined or integrated to the protrusion P, thereby giving the handle an L-shape appearance. Moreover, as shown in FIGS. 1, 4, 5 and 8 the handle H includes a fitted rubber sleeve 6 to insulate any heat transferred to the tray 1 or handle H from the heating element HE of the toaster BT, thereby adding further protection against burns.

Lastly, it should be noted that the handle H includes a finger resting platform 7 on top of the arm A, as shown in FIGS. 1-8, in order to help users to grab the handle with their thumb and either the index or middle finger, or both. The finger resting platform 7 is preferably a flat rubber or plastic surface connected to or integrally joined to arm A of the handle H. The finger resting platform 7 may also be covered by the fitted rubber sleeve 6.

Figure 9:
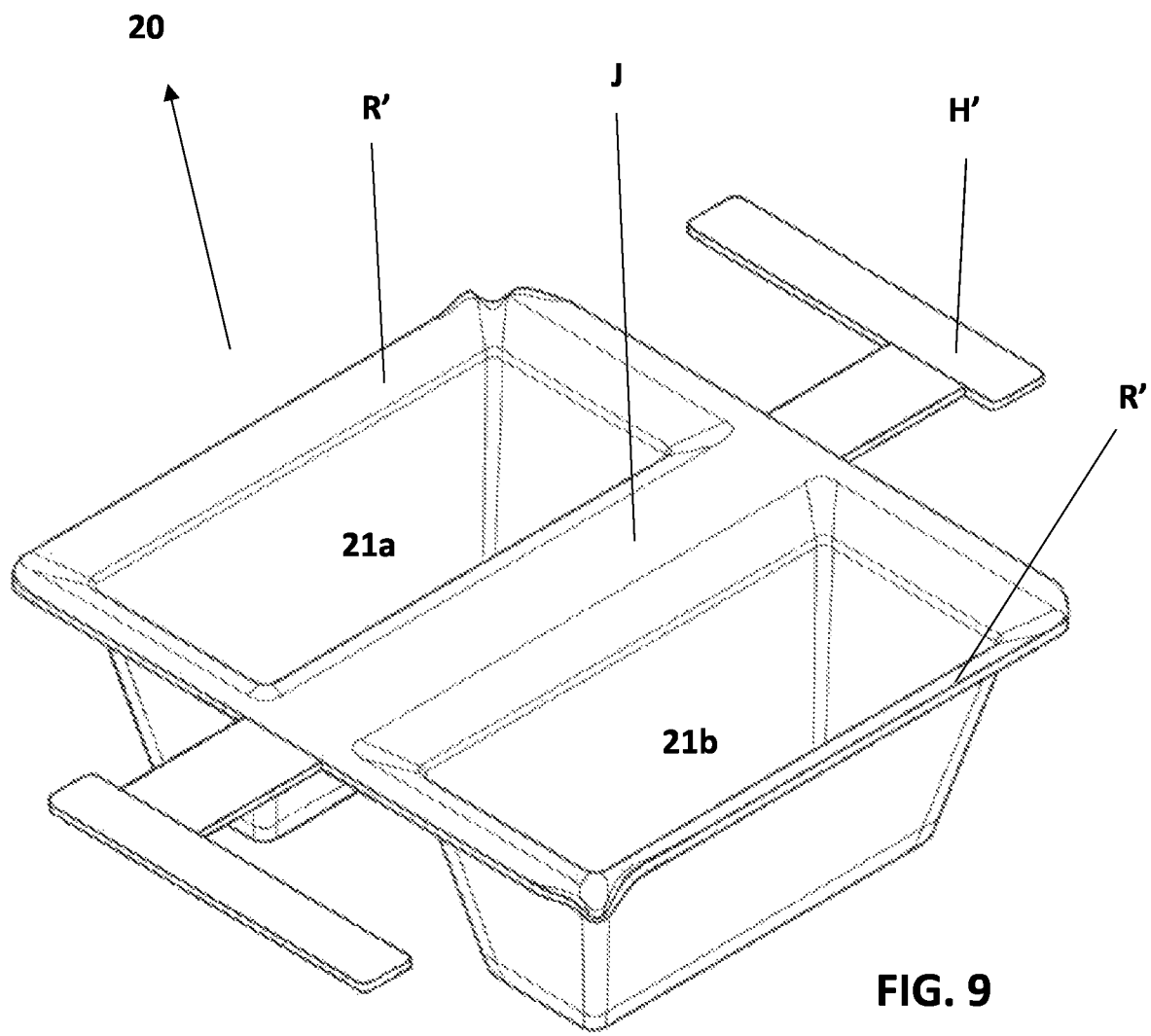
FIG. 9 is a perspective view of a double tray for simultaneous use in two of the bread toaster's slots.
Figure 10:
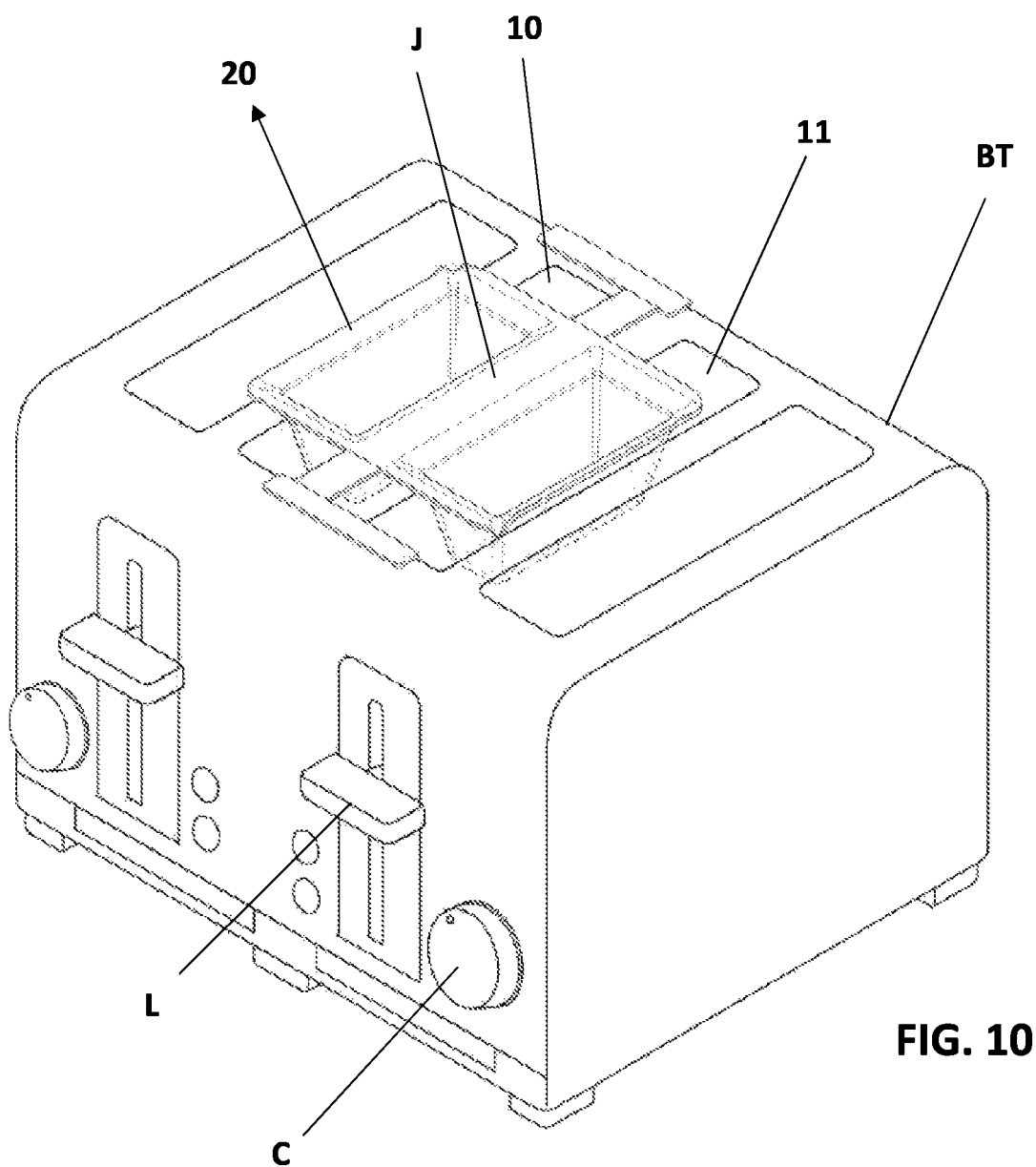
FIG. 10 is a perspective view of the double tray placed on two of the bread toaster's slots.

In another embodiment, the accessory for efficiently melting or softening cold solid spreads using the heat emanating from a bread toaster has a double tray 20 configuration that includes two trays 21a, 21b configured to simultaneously fit in two of the bread slots 10, 11 of the bread toaster BT, as shown in FIGS. 9-10. The double tray 20 is similar to the single tray 1 configuration described above except that the rim R' joins or integrates the two trays 21a, 21b together, forming a junction J at the point in which the rim R' of both trays 21a, 21b meet. The double tray 20 also comprises one or more handles H' integrated with the rims R'. It should be noted that the arm A' may or may not be perpendicular to the protrusion P'.

Figure 11:
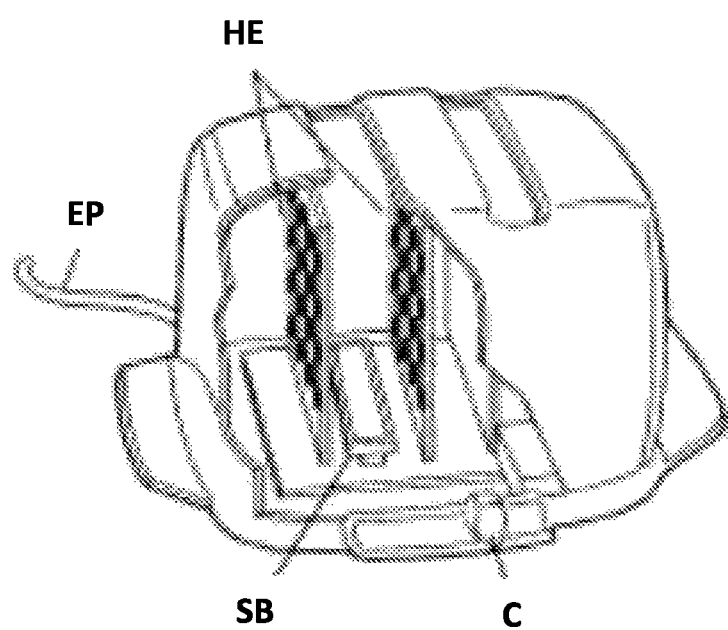
FIG. 11 shows the heating element inside of the toaster.

As noted above, both the tray 1 and double tray 20 are configured to fit into the slots 10, 11 of a conventional bread toaster BT. It is envisioned that the tray 1 or double tray 20 can be made available individually or in a kit with a conventional bread toaster BT. As known in the art, and as shown in FIGS. 8, 10 and 11, a conventional pop-up or automatic bread toaster BT comprises at least one slot 10, 11 for receiving a food item into the toaster, a least one toaster heating element HE for toasting or heating the food item, at least one electrical circuit for supplying electrical power EP to the toaster heating element and a control C to set at least one of the heating time and heating temperature. Furthermore, in conventional pop-up or automatic toasters BT, a single vertical piece of bread is dropped into a slot 10, 11 on the top of the toaster, where the slice is supported by a support bar SB. A lever L on the side of the toaster is pressed down, lowering the bread into the toaster and activating the heating elements HE. As known in the art, the heating element converts electrical energy into heat. Particularly, the electric currents coursing through the heating element encounter resistance, thereby resulting in heating of the element. The length of the toasting cycle (and therefore the degree of toasting) is adjustable via the lever L, knob, or series of pushbuttons, and when an internal device determines that the toasting cycle is complete, the toaster turns off and the toast pops up out of the slots. The completion of toasting may be determined by timer or by a thermal sensor, such as a bimetallic strip, located close to the toast.

One benefit of the configuration and measurements described above for the tray 1 or double tray 20 is that it allows the tray to be in close proximity with the heating element HE of the toaster BT but does not allow the tray to be in actual contact with it. Since the width of the tray 1 decreases as one moves from top to bottom, the tray 1 is never direct contact with the heating element HE of the toaster BT, it is solely in close proximity to it. Thus, the configuration of the tray 1 allows cold solid spreads within the tray to melt faster (due to its proximity to the heating element HE); and also avoids damaging the heating element of the toaster BT because the tray is not in actual contact with the heating element HE.

Accordingly, the accessory for melting or softening cold solid spreads using the heat emanating from a bread toaster, as described above, results in a bread toaster tray or accessory that: i) facilitates meting cold solid spreads in an efficient manner; ii) is easy to use or clean; iii) reduces the risk of spillage; and iv) can be used on any conventional toaster.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. An accessory for melting or softening cold or solid spreads using the heat emanating from a bread toaster having at least one bread slot for receiving a food item into the toaster, a least one toaster heating element for toasting or heating the food item, and at least one electrical circuit for supplying electrical power to the toaster heating element, the accessory comprising:

at least one tray comprising two flat side walls sitting opposite to each other, two flat end walls sitting opposite to each other, and a flat base; wherein a first portion of each side wall, a first portion of each end wall, and the base are configured to fit inside of the slot of the toaster, thereby allowing the first portion of each side walls the first portion of each end wall, and the base to be in close proximity with the heating element of the bread toaster; wherein a second portion of each side wall is configured to rest on an edge of the slot of the bread toaster; wherein a third portion of each side wall and a second portion of each end wall is configured to rest outside of the slot of the bread toaster; wherein the side walls have a length that is greater than the length of the end walls; wherein each side wall includes a corresponding bottom end and a corresponding top end; wherein each end wall includes a corresponding bottom end and a corresponding top end; wherein both side walls and end walls are obliquely joined, via the corresponding bottom ends, to the base, thereby defining the bottom of the tray; wherein the side walls and end walls project upwardly and away from the center of the base; wherein each side wall includes end portions that converge with corresponding end portions on the end walls, thereby defining, in combination with the base, an interior of the tray; wherein the interior of the tray comprises rounded edges at the point or area of the tray in which the side walls and end walls converge with each other and at the point or area of the tray in which the side walls and end walls obliquely join or converge with the base; wherein the tray comprises a rim surrounding the top end of the side walls and the top end of the end walls; a handle integrated to the rim of the tray; wherein the handle comprises a protrusion integrated to the rim of the tray, a vertical arm having a top section and a bottom section, and wherein the bottom section of the vertical arm is perpendicularly joined or integrated to the protrusion; and wherein the handle comprises a finger resting platform having a flat surface connected to or integrally joined to the top section of the vertical arm.

2. The accessory of claim 1, wherein the handle comprises a fitted rubber or heat insulating grip.

3. The accessory of claim 1, further comprising a second tray having a second rim, wherein the second rim of the second tray is integrated to the rim of the tray.

4. The accessory of claim 3, further comprising one or more handles integrated to the rim or second rim.

5. The accessory of claim 1, wherein the tray comprises a material having a high thermal conductivity.

6. The accessory of claim 5, wherein the material having a high thermal conductivity is metal.

7. The accessory of claim 1, wherein the width from the top end of the first side wall to the top end of the second side wall, is 4.5 cm wide and the width from the bottom end of the first side wall to the bottom end of the second side wall, is 2.5 cm wide.

8. The accessory of claim 7, wherein the length from the top end of the first end wall to the top end of the second end wall, is 8 cm long and the length from the bottom end of the first end wall to the bottom end of the second end wall, is 7 cm long.

9. The accessory of claim 8, wherein the height from the bottom ends of the side walls to the corresponding top ends of side walls, is 2.5 cm high and the height from the bottom ends of the end walls to the corresponding top ends of the end walls, is 2.5 cm high.

10. The accessory of claim 1, wherein the rim includes a spout integrated therein and corresponding with one of the rounded edges at the point or area of the tray in which the side walls and end walls converge with each other.

11. The accessory of claim 1, wherein the rim is configured to project upwardly and away from the top end of the side walls, and the top end of the end walls.

\* \* \* \* \*